Nov. 15, 1966   J. LUESCHER ETAL   3,286,137
SEMI-CONDUCTOR RECTIFIER ARRANGEMENT HAVING
SELF-PROTECTION AGAINST OVERVOLTAGE
Filed July 14, 1961   3 Sheets-Sheet 1

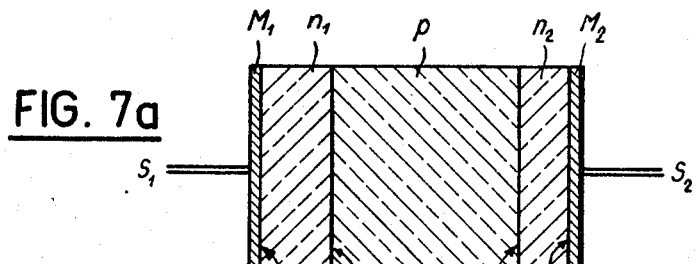
FIG. 7a
FIG. 7b
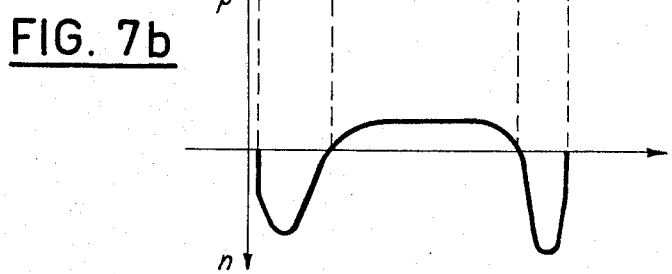
FIG. 8
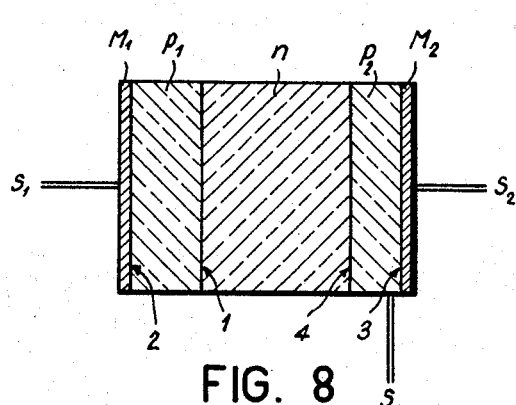
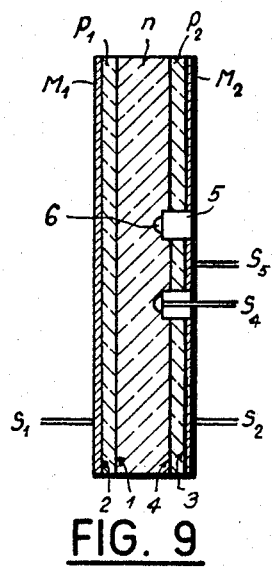
FIG. 9

United States Patent Office 3,286,137
Patented Nov. 15, 1966

3,286,137
SEMI-CONDUCTOR RECTIFIER ARRANGEMENT HAVING SELF-PROTECTION AGAINST OVER- VOLTAGE
Jakob Luescher and Bogdan Zega, Geneva, Switzerland, assignors to Compagnie Generale d'Electricite, Paris, France
Filed July 14, 1961, Ser. No. 124,039
Claims priority, application Switzerland, July 19, 1960, 8,222/60
6 Claims. (Cl. 317—234)

The present invention relates to a semi-conductor rectifier arrangement having self-protection against over voltage, the arrangement comprising at least one junction between two semi-conductor layers of opposite conductivity types, each of the two outermost semi-conductor layers having a metallic coating thereon.

Semi-conductor rectifier arrangements, whether consisting of a simple rectifier having one or two junctions between semi-conductor layers of different types of conductivity (for example p-i-n) or a controllable rectifier having more than two such junctions (for example p-n-p-n), have the disadvantage that they are thermally overloaded and instantaneously destroyed by over voltage in the reverse direction. The thermal time constant of such a disruption is extremely small, so that electromechanical switches respond too slowly to be able to afford protection. On the other hand, it is possible to connect in parallel but in opposition with the rectifier arrangement a similar controllable arrangement which momentarily short-circuits dangerous overvoltages. However, such a protective circuit has the disadvantage of being complicated and costly.

The present invention relates to a semi-conductor rectifier arrangement in which, in accordance with the invention, the doping of the two outermost or end layers and their metallic coatings are so chosen that, when the p-n junction formed by one of the outermost layers with the adjacent semi-conductor layer is biased in the reverse direction, the end junction formed between the one outermost layer and its metallic coating injects into the one outermost layer minority charge carriers, which upon passing through this layer and upon reaching the p-n junction, cause the arrangement to change over to a state of high conductivity when the reverse current exceeds a particular value.

Three constructional examples of such semi-conductor rectifier arrangements and various characteristic curves of their operation are diagraimatically illustrated in the accompanying drawings.

FIGURE 1b illustrates the doping at impurity centers within the semi-conductor layers in FIGURE 1a.

FIGURE 4 is a VI characteristic curve of an arrangement according to the invention as illustrated in FIGURE 1a.

FIGURE 5b illustrates the doping at impurity centers within the semi-conductor layers in FIGURE 5a.

FIGURE 6 is the VI characteristic curve of the arrangement according to FIGURE 5a.

Figure 5A:
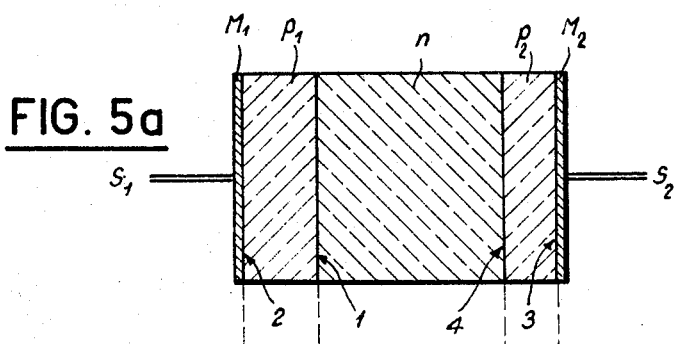
FIGURE 5a is a section through a further semi-conductor rectifier arrangement.
Figure 5B:
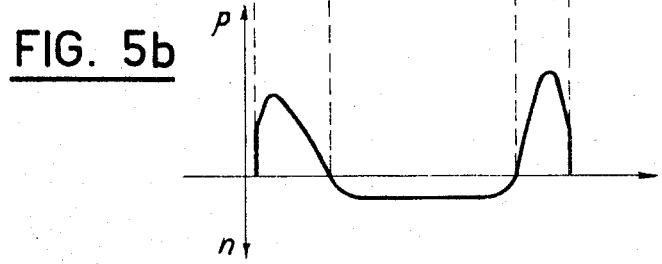

FIGURE 7a and FIGURE 7b relate to a dual arrangement in relation to the semi-conductor rectifier arrangement illustrated in FIGURES 5a and 5b.

FIGURES 8 and 9 are sections through a semi-conductor rectifier arrangement according to FIGURE 5a, but with special terminal connecting members for a control voltage.

In accordance with the present invention, the junctions between the metal coatings, which also serve as components of the current leads, and the adjacent semi-conductor layers play a very particular part. Within these junctions, the periodic lattice structure of the monocrystal is disturbed by the closeness of the surface and the closeness of the metal coating, the result of which is that there are set up within the forbidden zone between the valence band and the conduction band permitted energy levels which cause an increased thermal generation of charge carriers. There exists in thermodynamic equilibrium in relation to this increased thermal generation an increased recombination of charge carriers.

If it is ensured that, immediately adjacent to such junction, the doping of the semi-conductor layer is relatively low and the lattice structure of the crystal has few disturbances, so that the lifetime of charge carriers injected from such a junction is sufficiently high, this junction can generally be employed as an emitter of charge carriers.

Figure 1A:
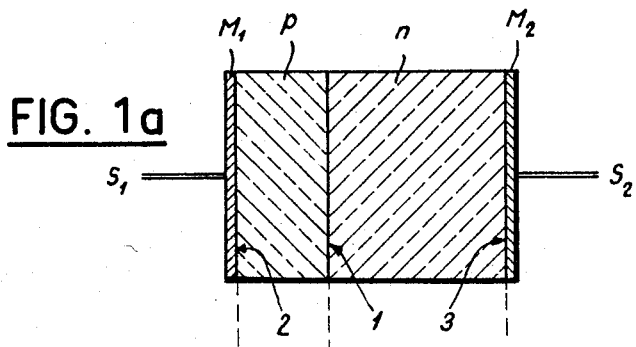
FIGURE 1a is a section through a first, particularly simple semi-conductor rectifier arrangement.

FIGURE 1a illustrates in section a simple uncontrollable rectifier arrangement in which a strongly p-doped end layer forms the junction 1 with a weakly n-doped end layer within a semi-conductor silicon monocrystal. These p- and n-layers are fixedly connected to metal coatings $M_1$ and $M_2$ respectively. $S_1$ and $S_2$ are the members leadings the current $M_1$ and $M_2$ respectively.

A forward current directed from $M_1$ to $M_2$ is carried substantially by holes injected at 1 from the p-layer into the n-layer and by electrons injected from the junction layer 3, while for a reverse current directed from $M_2$ to $M_1$, such as is set up in the non-conducting intervals of the rectifiers of a rectifier arrangement, the minority charge carriers of the two layers pass through the junction 1 and the blocking zone extending to the left and right thereof.

With suitable metal coatings, the end junctions 2 and 3 between $M_1$ and p, and between n and $M_2$, respectively, for small currents are purely ohmic resistances having no rectifier effect. This purely ohmic behavior is exhibited, for example, by coatings of tin $M_2$ and of tin indium for $M_1$, provided that these metals are sufficiently pure and are suitably securely connected to the semi-conducting monocrystal in such manner that no impurities can diffuse from the metals into the adjoining semi-conductor layers. This can be ensured in various ways:

(a) The surface of the semi-conducting monocrystal is purified in a high vacuum by bombardment with ions of a reducing or neutral gas, preferably a rare gas. A thin coating of the metal concerned is then applied in a high vacuum by vaporization. This coating is finally galvanically thickened by a further metal, for example copper.

(b) The surface of the semi-conducting monocrystal is etched in an electrolyte and a coating of the metal concerned is then galvanically deposited. This coating may, if necessary, be galvanically thickened by a further metal, for example copper.

(c) It has been found particularly desirable to etch the surface of the monocrystal by a fluid free from atoms producing impurity centers and then to drive off this fluid by melting the metal forming the coating concerned.

Figures 2, 3:
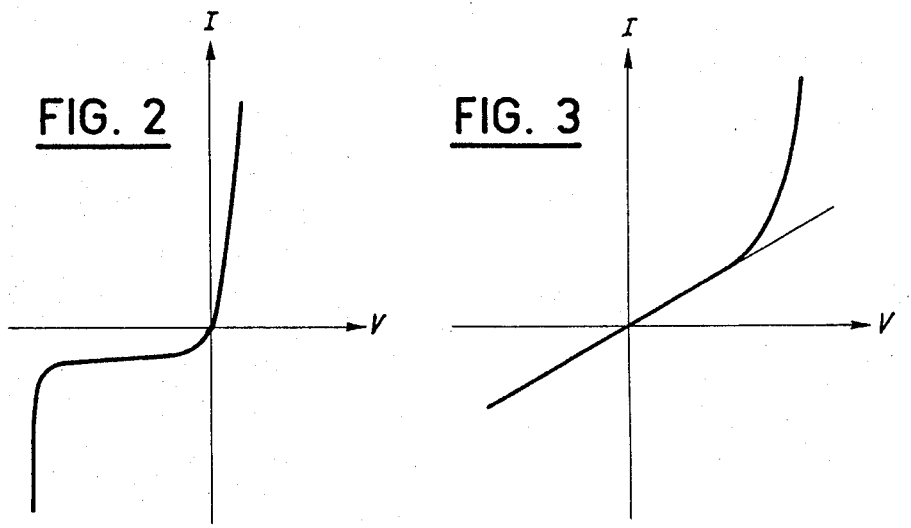
FIGURE 2 is a VI characteristic curve of a conventional rectifier.
FIGURE 3 is a characteristic curve representing a physical effect advantageous to the invention.

The coatings thus produced give junctions which no longer behave purely ohmically from a particular current strength, but emit charge carriers. As illustrated in FIGURE 3 in the case of coating on p-doped silicon or germanium, they emit more electrons than would correspond to the continuation of the purely ohmic behaviour.

Figure 1B:
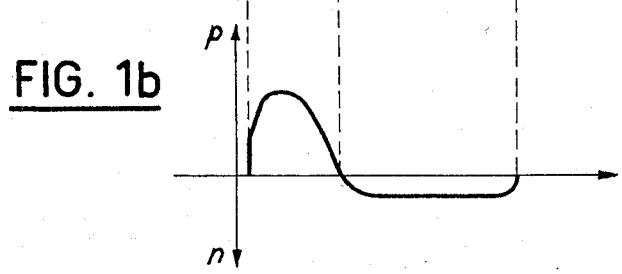

This additional emission of electrons is, as stated above, presumably due to the fact that in the junctions 2 and 3 the lattice structure, which is regular within the monocrystal, is disturbed by the closeness of the surface and the closeness of the metal coating, whereby there may be set up in the gap, forbidden within the monocrystal, between the valence band and the conduction band of the semi-conductor, intermediate levels from which additional electrons are liberated by a particular field strength. This additional liberation of electrons is favoured by a higher electrical field strength in the junctions 2 and 3. In the case of the strongly doped and therefore low-resistance p-layer in FIGURE 1a it is advantageous, as illustrated in FIGURE 1b, to cause the doping to decrease in the direction towards the metal coating $M_1$. The electrical field strength in the junction 2 is thus increased without the resultant conductivity of the p-layer and its activity as an emitter of holes being substantially impaired. This decrease in the doping of the p-layer may be brought about before the application of the coating $M_1$ by a tempering operation in which acceptors are diffused from the surface of the p-layer.

Figure 4:
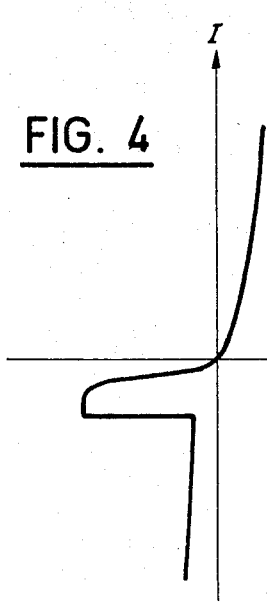

The junction 2 as an electron emitter produces for reverse currents, i.e. in the blocking interval of the rectifier arrangement according to FIGURE 1a, a modification of the conventional VI characteristic curve of a rectifier, as illustrated in FIGURE 2. The electrons injected by 2 pass, in opposition to the electric field and after passing through the blocking zone at 1, into the junction 3, in which they liberate holes which travel with the electric field through the blocking zone at 1 to 2, where they intensify the injection of electrons. This injection of electrons and liberation of holes, with a particular reverse current being attained, prompts a changeover into a state of high conductivity, so that the VI characteristic curve shown in FIGURE 4 then takes the place of that illustrated in FIGURE 2. This changeover effect occurs as in a p-n-p-n-rectifier arrangement, it being possible in the present case to regard $M_1$-p-n and p-n-$M_2$ as the intercoupled complementary transistors.

Figure 6:
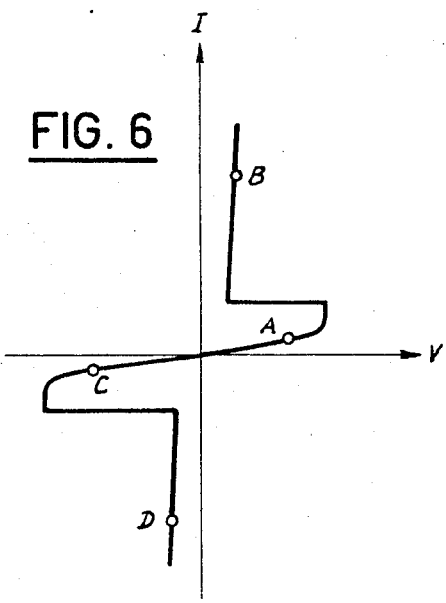

FIGURES 5a and 5b illustrate a further development of the rectifier arrangement according to FIGURES 1a and 1b by the addition of a further strongly p-doped layer $p_2$, so that a rectifier arrangement $M_1$-$p_1$-n-$p_2$-$M_2$ is formed, which now has p-n junctions 1 and 4 and the two end junctions 2 and 3 between a metallic coating and a semi-conductor end layer. A current directed from $M_1$ to $M_2$ could pass through the junction 1 substantially without hindrance, while a barrier layer is set up to the left and to the right of 4, as was the case at the junction 1 in FIGURE 1 with a reverse current. The rectifier arrangement according to FIGURE 5a therefore has a VI characteristic curve as illustrated in FIGURE 6.

In a special application of FIGURES 5a and 5b, the arrangement is symmetrical, in regard to geometry and doping, to a plane perpendicular to the current direction. The VI characteristic curve according to FIGURE 6 is then necessarily inversely symmetrical to the coordinate origin.

FIGURES 7a and 7b illustrate the dual arrangement corresponding to FIGURES 5a and 5b, which is formed by interchanging the p- and n-dopings. The VI characteristic curve according to FIGURE 6 is not thereby modified.

The rectifier arrangements corresponding to FIGURES 5a and 7a may be made controllable by connecting a special control electrode to at least one of the semi-conductor layers fixedly connected to one of the two metal coatings. This will be more fully explained with reference to one of the four possible cases.

FIGURE 8 illustrates an arrangement conforming to FIGURE 5a, in which, however, a control electrode $S_3$ is laterally connected to the layer $p_2$. The rectifier arrangement is assumed to be under voltage for a forward current directed from $M_1$ to $M_2$, but to be still in the state corresponding to point A of the VI characteristic curve of FIGURE 6, i.e. it is assumed that the blocking layer to the left and to the right of the junction 4 is temporarily still blocking the passage of current. If a voltage pulse is applied between $S_3$ and $S_2$ and raises the potential of $p_2$ in relation to $M_2$, the junction layer 3 injects a cloud of electrons which triggers the above-described mechanism of the changeover into a state of high conductivity. The point of the state in the VI characteristic curve of FIGURE 6 thus changes from A to B, the current strength corresponding to B being determined substantially by the resistance in the external, feeding circuit. This method of control has the disadvantage that it is effective only for one current direction in the main circuit, and that a relatively large control current is necessary therewith.

These disadvantages are obviated by the rectifier arrangement according to FIGURE 9, which differs from the arrangement according to FIGURE 5 in that a groove 5, for example of circular form, has been etched into the combination n-$p_2$-$M_2$. Situated on the base of the groove is a strongly n-doped contact 6 which renders possible the connection of one control electrode $S_4$ to the layer n. The other control electrode $S_5$ is connected to the metal coating of the cylinder left in the etching of the combination n-$p_2$-$M_2$. This cylinder is separated from the remainder of the combination $p_2$-$M_2$ by the groove and forms with $p_1$ as a collector a transistor having the layer n as its base electrode.

If $S_5$ is made positive in relation to $S_4$ by a voltage pulse, the strongly n-doped contact 6 injects electrons into the weakly doped layer n, while that portion of the layer $p_2$ which is situated in the remaining stub injects holes into the weakly doped layer n. These charge carriers then travel in opposite directions under the influence of the voltage applied between $S_1$ and $S_2$, and cause the rectifier arrangement, when it is in one of the states corresponding to the point A or the point C of FIGURE 6, to change over into a state of high conductivity corresponding to point B and point D respectively of FIGURE 6. Since in this case the control does not take place at a junction between a metal and a semi-conductor, the necessary control current is small.

If the rectifier arrangement according to FIGURE 9 has a relatively large current-carrying cross-section, there may be provided over the surface of the metal coating $M_2$, $M_1$ a plurality of terminal connecting members, if desired connected in parallel, for the introduction of the control pulse, instead of one such terminal connecting member as in FIGURE 9.

It is to be noted that the circular groove 5 may be replaced by a groove of different form, or any other means by which one portion of a p-semi-conductor layer with the metal coating applied thereto may be separated from the remainder of the said layer and of the said metal coating.

In the embodiments described by way of example, it has been assumed that the semi-conducting monocrystal is a silicon monocrystal. The advantages characteristic of the invention, however, are obtained even if a germanium monocrystal is employed instead of a silicon monocrystal.

With regard to the use of the semi-conductor rectifier arrangement according to the invention, the resistance in the external feeding circuit is intended to limit the current strength rapidly increasing after the changeover into the state of high conductivity, to values which are still permissible for the semi-conductor rectifier arrangement. The current-limiting resistance in the external circuit may be a fixed resistance, or it may be a resistance which increases with the current strength, and in some cases a resistance which increases infinitely with the current strength, i.e. a rapidly interrupting cutout.

What is claimed is:

1. A semi-conductor rectifier having self-protection against overvoltage, said rectifier including, a relatively thin first semi-conductor end layer and a relatively thick second semi-conductor end layer, said semi-conductor layers being of opposite conductivity types and forming a p-n junction, first and second metallic coatings forming corresponding end junctions with said first and second semi-conductor end layers and said metallic coatings having properties for said end junctions to emit charge carriers when a reverse bias is applied across said p-n junction, the maximum doping of said first semi-conductor end layer being stronger than the doping of said second semi-conductor end layer and the doping of said first semi-conductor end layer being diminished from said maximum both toward said first metallic coating for the field strength in said corresponding end junction to be increased and toward said p-n junction to have said corresponding end junction emit charge carriers to said p-n junction when said p-n junction is reversely biased and the rectifier to change over to a state of high electrical conductivity when the corresponding reverse electric current exceeds a particular value.

2. A semi-conductor rectifier of the character set forth in claim 1, wherein the p-layer metallic coating is indium and the n-layer metallic coating is tin.

3. A semi-conductor rectifier of the character set forth in claim 1, wherein both of said metallic coatings are tin.

4. A semi-conductor rectifier having self-protection against overvoltage, said rectifier including doped first and second relatively thin semi-conductor end layers and a doped relatively thick semi-conductor intermediate layer between said semi-conductor end layers and of opposite conductivity type to said first and second semi-conductor end layers and forming a first p-n junction with said first semi-conductor end layer and a second p-n junction with said second semi-conductor end layer, and first and second metallic coatings forming correspondingly first and second end junctions with said first and second semi-conductor end layers and said first and second metallic coatings having properties for the respective one of said first and second end junctions to emit charge carriers when the respective one of said first and second p-n junctions is reversely biased, the maximum doping of said semi-conductor end layers being stronger than the doping of said semi-conductor intermediate layer and the dopings of said first and second semi-conductor end layers being diminished from said maximum thereof respectively to said first and second metallic coatings for the field strength in said end junction to be increased to have said end junction emit charge carriers to said respective one of said p-n junctions when said p-n junction is reversely biased and the rectifier to change over to a state of high electrical conductivity upon the corresponding reverse electrical current being in excess of a particular value.

5. A semi-conductor rectifier of the character set forth in claim 4, wherein at least one of said semi-conductor end layers is provided with a control electrode for applying a control voltage between the latter semi-conductor end layer and said metallic coating thereon.

6. A semi-conductor rectifier of the character set forth in claim 4, wherein a portion of a said semi-conductor end layer and of said metallic coating thereon is isolated from the remainder of the same semi-conductor end layer and of the metallic coating thereon, the metallic coating of said portion and semi-conductor intermediate layer each being provided with an electrode for a control voltage to be applied.

References Cited by the Examiner

UNITED STATES PATENTS

| | | | |
|---|---|---|---|
| 2,852,677 | 9/1958 | Shockley | 307—88.5 X |
| 2,914,715 | 11/1959 | Uhlir | 317—234 |
| 2,966,434 | 12/1960 | Hibberd | 317—235 |
| 3,141,119 | 7/1964 | Philips | 317—235 |
| 3,208,887 | 9/1965 | Anderson | 317—235 |

JOHN W. HUCKERT, *Primary Examiner.*

JAMES D. KALLAM, R. F. POLISSACK,
*Assistant Examiners.*